United States Patent
Wright et al.

(10) Patent No.: US 12,391,179 B2
(45) Date of Patent: Aug. 19, 2025

(54) METHODS AND SYSTEMS FOR PARKING TRAILERS TOWED BY VEHICLE UTILIZING VEHICLE SENSORS AND BASED ON A PROFILE AND REQUIRED CLEARANCES FOR THE TRAILER

(71) Applicant: GM GLOBAL TECHNOLOGY OPERATIONS LLC, Detroit, MI (US)

(72) Inventors: Adam L Wright, Livonia, MI (US); Nathaniel W Hart, Beverly Hills, MI (US); Russell A Patenaude, Macomb Township, MI (US); Matthew Edward Gilbert-Eyres, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 222 days.

(21) Appl. No.: 18/347,543

(22) Filed: Jul. 5, 2023

(65) Prior Publication Data
US 2025/0010794 A1    Jan. 9, 2025

(51) Int. Cl.
*B60R 1/00* (2022.01)
*B62D 13/00* (2006.01)

(52) U.S. Cl.
CPC .............. *B60R 1/003* (2013.01); *B62D 13/00* (2013.01)

(58) Field of Classification Search
CPC ........ B60R 1/003; B62D 13/00; B62D 13/06; B62D 15/028
See application file for complete search history.

(56) References Cited

U.S. PATENT DOCUMENTS

| | | | | |
|---|---|---|---|---|
| 2019/0210418 A1* | 7/2019 | Hall | ....................... | B60W 30/00 |
| 2021/0221301 A1* | 7/2021 | Newell | .................... | B60R 11/04 |
| 2021/0221363 A1* | 7/2021 | Lai | ........................... | G08G 1/165 |
| 2023/0103776 A1* | 4/2023 | Fuller | ..................... | B60R 25/24 |
| | | | | 701/49 |
| 2023/0116438 A1* | 4/2023 | Johansson | ............... | E05C 17/56 |
| | | | | 49/381 |

FOREIGN PATENT DOCUMENTS

| | | |
|---|---|---|
| DE | 102013200385 A1 | 7/2014 |
| DE | 102016216684 A1 | 4/2017 |
| DE | 102016109954 A1 | 11/2017 |
| DE | 102016221743 A1 | 5/2018 |
| DE | 102018221863 A1 | 6/2020 |

* cited by examiner

*Primary Examiner* — Sze-Hon Kong
(74) *Attorney, Agent, or Firm* — Ingrassia Fisher & Lorenz, LLP | IF&L

(57) ABSTRACT

Methods and systems are provided that include sensors and a processor of a vehicle that is configured to tow a trailer. The sensors are configured to obtain sensor data pertaining to surroundings of the trailer. The processor is coupled to the sensors, and is configured to at least facilitate retrieving information as to a profile of the trailer, the profile including required clearances for the trailer based on extensions of the trailer that are configured to be retracted while the trailer is moving and fully extended when the trailer is parked and the extensions are utilized; determining whether any obstacles are in a path of the trailer when the extensions are fully extended, based on the sensor data and the profile; and taking an action, in accordance with instructions provided by the processor, when obstacles are in the path of the trailer.

20 Claims, 7 Drawing Sheets

METHODS AND SYSTEMS FOR PARKING TRAILERS TOWED BY VEHICLE UTILIZING VEHICLE SENSORS AND BASED ON A PROFILE AND REQUIRED CLEARANCES FOR THE TRAILER

TECHNICAL FIELD

The technical field generally relates to vehicles and, more specifically, to systems and methods for parking trailers towed by vehicles.

BACKGROUND

Certain vehicles today have systems that control towing of a trailer, including parking of the trailer. However, existing techniques may not always provide optimal parking for the trailer.

Accordingly, it is desirable to provide improved methods and systems for controlling parking of a trailer that is being towed by the vehicle. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided that includes obtaining, via one or more sensors of a vehicle that is towing a trailer, sensor data pertaining to surroundings of the trailer; retrieving information as to a profile of the trailer, the profile including required clearances for the trailer based on one or more extensions of the trailer that are configured to be retracted while the trailer is moving and fully extended when the trailer is parked and the one or more extensions are utilized; determining, via a processor, whether any obstacles are in a path of the trailer when the one or more extensions are fully extended, based on the sensor data and the profile; and taking an action, in accordance with instructions provided by the processor, when it is determined that one or more obstacles are in the path of the trailer.

Also in an exemplary embodiment, the step of taking the action includes providing a warning for a user on a display system of the vehicle in accordance with the instructions provided by the processor when it is determined that one or more obstacles are in the path of the trailer.

Also in an exemplary embodiment, the step of taking the action includes performing an automatic control action pertaining to movement of the vehicle in accordance with the instructions provided by the processor when it is determined that one or more obstacles are in the path of the trailer.

Also in an exemplary embodiment, the determining as to whether any obstacles are in the path of the trailer is performed before the one or more extensions are fully extended.

Also in an exemplary embodiment, the determining as to whether any obstacles are in the path of the trailer is performed while the trailer is being parked in a parking spot as it is towed by the vehicle.

Also in an exemplary embodiment, the method further includes generating, via the processor, the profile for the trailer based on information as to the one or more extensions of the trailer and respective clearances required for the one or more extensions when fully extended; and storing, into a non-transitory computer readable storage medium of the vehicle, the profile for the trailer prior to towing the trailer by the vehicle.

Also in an exemplary embodiment, the method further includes transmitting the profile to a remote server for storage at the remote server and for subsequent use by other users of other trailers.

Also in an exemplary embodiment, the method further includes obtaining, via a transceiver, the profile from a remote server pertaining to one or more other trailers with similar characteristics as the trailer; and storing, into a non-transitory computer readable storage medium of the vehicle, the profile prior to towing the trailer by the vehicle.

Also in an exemplary embodiment, the method further includes determining, via the processor, whether any ground surface issues are present in proximity to the vehicle for when the one or more extensions are fully extended, based on the sensor data and the profile; and taking the action, in accordance with the instructions provided by the processor, when it is determined that one or more ground surface issues proximate the trailer.

Also in an exemplary embodiment, the method further includes determining, via the processor, whether any conditions are present in proximity to the trailer for when the one or more extensions are fully extended, based on the sensor data and the profile; obtaining weather conditions in proximity to the trailer that may affect the conditions; and taking the action, in accordance with the instructions provided by the processor, when it is determined that the conditions are likely to pose a problem given the weather conditions.

Also in an exemplary embodiment, the method further comprises determining, via the processor using the sensor data, respective distances of one or more hook-ups to the trailer; and taking the action, in accordance with the instructions provided by the processor, when it is determined that one or more of the respective distances exceed a predetermined threshold.

In another exemplary embodiment, a system is provided that includes one or more sensors of a vehicle that is configured to tow a trailer, the one or more sensors configured to obtain sensor data pertaining to surroundings of the trailer; and a processor that is coupled to the one or more sensors and that is configured to at least facilitate retrieving information as to a profile of the trailer, the profile including required clearances for the trailer based on one or more extensions of the trailer that are configured to be retracted while the trailer is moving and fully extended when the trailer is parked and the one or more extensions are utilized; determining whether any obstacles are in a path of the trailer when the one or more extensions are fully extended, based on the sensor data and the profile; and taking an action, in accordance with instructions provided by the processor, when it is determined that one or more obstacles are in the path of the trailer.

Also in an exemplary embodiment, the processor is further configured to at least facilitate providing a warning for a user on a display system of the vehicle in accordance with the instructions provided by the processor when it is determined that one or more obstacles are in the path of the trailer.

Also in an exemplary embodiment, the processor is further configured to at least facilitate performing an automatic control action pertaining to movement of the vehicle in accordance with the instructions provided by the processor when it is determined that one or more obstacles are in the path of the trailer.

Also in an exemplary embodiment, the processor is further configured to at least facilitate determining whether any obstacles are in the path of the trailer before the one or more extensions are extended and the trailer is being parked in a parking spot as it is towed by the vehicle.

Also in an exemplary embodiment, the processor is further configured to at least facilitate generating the profile for the trailer based on information as to the one or more extensions of the trailer and respective clearances required for the one or more extensions when fully extended; and storing, into a non-transitory computer readable storage medium of the vehicle, the profile for the trailer prior to towing the trailer by the vehicle.

Also in an exemplary embodiment, the processor is further configured to at least facilitate transmitting the profile to a remote server for storage at the remote server and for subsequent use by other users of other trailers.

Also in an exemplary embodiment, the processor is further configured to at least facilitate obtaining, via a transceiver, the profile from a remote server pertaining to one or more other trailers with similar characteristics as the trailer; and storing, into a non-transitory computer readable storage medium of the vehicle, the profile prior to towing the trailer by the vehicle.

Also in an exemplary embodiment, the processor is further configured to at least facilitate determining whether any ground surface issues are present in proximity to the vehicle for when the one or more extensions are fully extended, based on the sensor data and the profile; and taking the action, in accordance with the instructions provided by the processor, when it is determined that one or more ground surface issues proximate the trailer.

In accordance with another exemplary embodiment, a vehicle is provided that includes a body, a propulsion system, one or more sensors, and a processor. The propulsion system is configured to generate movement of the body. The hitch is configured for coupling to a trailer for towing the trailer. The one or more sensors are configured to obtain sensor data pertaining to surroundings of the trailer. The processor is coupled to the one or more sensors, and is configured to at least facilitate retrieving information as to a profile of the trailer, the profile including required clearances for the trailer based on one or more extensions of the trailer that are configured to be retracted while the trailer is moving and fully extended when the trailer is parked and the one or more extensions are utilized; determining whether any obstacles are in a path of the trailer when the one or more extensions are fully extended, based on the sensor data and the profile; and taking an action, in accordance with instructions provided by the processor, when it is determined that one or more obstacles are in the path of the trailer.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
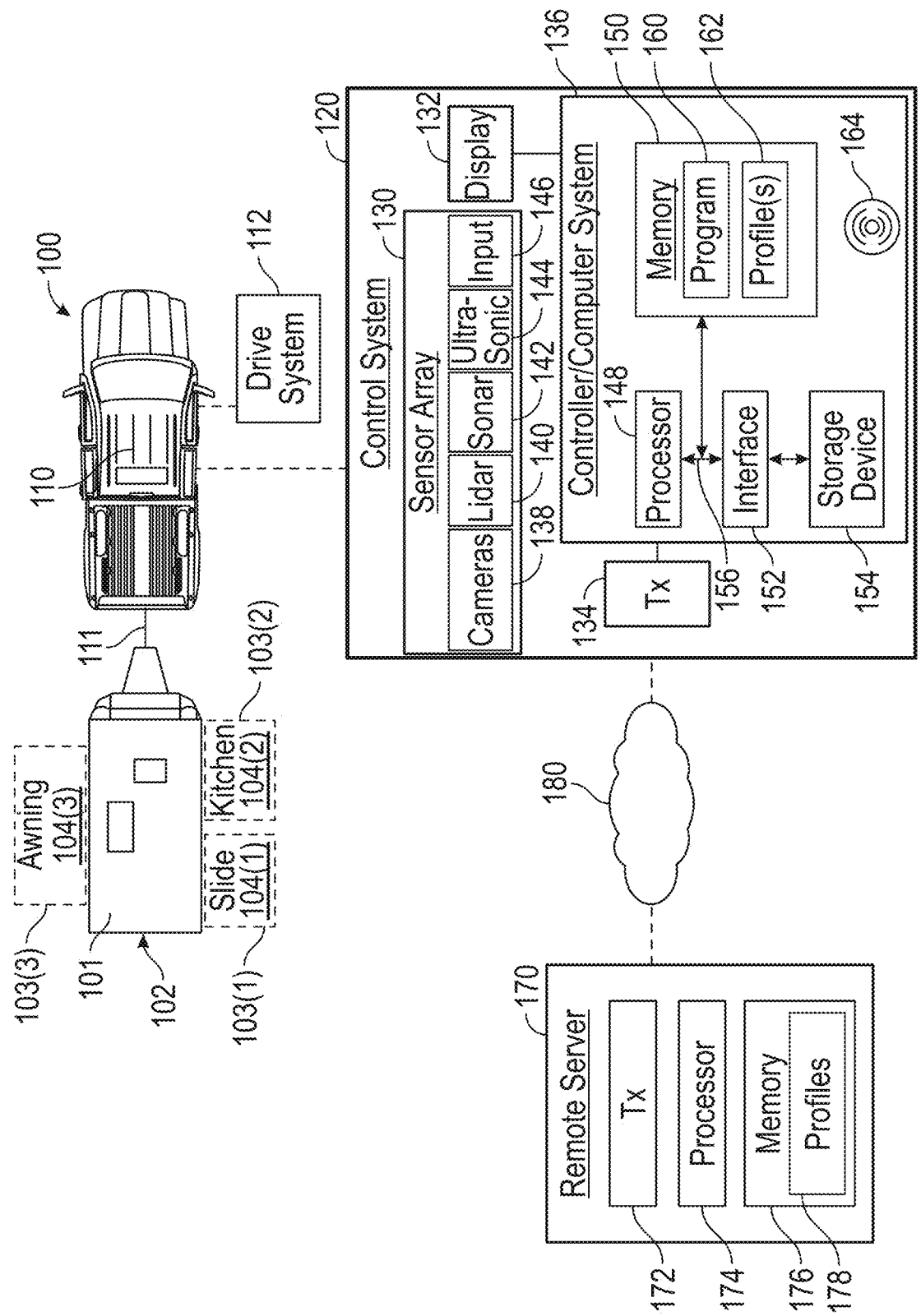
FIG. 1 is a functional diagram of a vehicle that is configured to tow and control parking for a trailer, and with the vehicle depicted along with the trailer and a remote server that communicates with the vehicle, in accordance with exemplary embodiments.

FIG. 1 is a functional diagram of a vehicle 100 alongside a trailer 101. In various embodiments, the vehicle 100 is configured to tow the trailer 101. In addition, in various embodiments, and as described in greater detail further below, the vehicle 100 includes a control system 120 that is configured to control and optimize parking related maneuvers for the trailer 101, and specifically that takes into account extensions 103 of the trailer 101 that are not visible while the trailer 101 is being parked and/or is otherwise moving, in accordance with the steps of the process 200 of FIG. 2 and the sub-processes and implementations of FIGS. 3-7 and as described in greater detail further below in connection therewith.

As depicted in FIG. 1, in exemplary embodiments the trailer 101 includes a body 102 as well as a plurality of extensions 103. In various embodiments, the extensions 103 are in a retracted stated, and not visible, when not in use (e.g., when the trailer 101 is being parked and/or moving). Specifically, in various embodiments, the extensions 103 are configured to be retracted while the trailer 101 is moving and extended when the trailer 101 is parked and the extensions 103 are utilized Accordingly, while the trailer 101 is being parked or is otherwise moving, the entire envelope of the trailer 101 is represented by the body 102 of the trailer 101. However, when the extensions 103 are extended, they generate respective extended regions 104 that increase the envelope of the trailer 101 and that require additional clearance from obstacles. In the exemplary depiction of FIG. 1, the extensions 103 include a first extension 103(1) (e.g., a slide out), a second extension 103(2) (e.g., a kitchen), and a third extension 103(3) (e.g., an awning), each of which generate respective extended regions 104(1), 104(2), and 104(3) with associated required clearances when extended. It will be appreciated that in different embodiments the trailer 101 may have a different number and/or type(s) of the extensions 103.

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

In certain embodiments, the vehicle 100 may comprise an autonomous or semi-autonomous vehicle, for example in which vehicle control (including acceleration, deceleration, braking, and/or steering) is automatically planned and executed by the control system 120. In certain other embodiments, the vehicle 100 may comprise a human operated vehicle in which control is executed via a human driver.

In the depicted embodiment, the vehicle 100 includes a body 110 that is arranged on a chassis. The body 110 substantially encloses other components of the vehicle 100. As depicted in FIG. 1, in various embodiments the vehicle 100 includes a hitch 111 that is configured to be coupled to the trailer 101 for towing the trailer 101.

In various embodiments, the vehicle 100 also includes a drive system 112. In various embodiments, the drive system 112 includes one or more engines and/or motors that provide for movement of the vehicle 100 that are controlled via inputs by a driver (e.g., via an accelerator pedal in certain embodiments) and/or automatically via the control system 120. In various embodiments, the drive system 112 may also include or be coupled to one or more other vehicle systems that control movement of the vehicle 100, such as braking system and/or steering system that may similarly be controlled either via inputs by a driver (e.g., via a brake pedal or accelerator pedal, respectively, in certain embodiments) and/or automatically via the control system 120.

In various embodiments, as depicted in FIG. 1, the control system 120 is coupled to the drive system 112, and controls operation thereof. In addition, in various embodiments, the control system 120 provides information and/or control over towing of the trailer 101 and parking thereof, including taking into account the extensions 103 of the trailer 101 that are retracted and are not visible during parking and other movement of the trailer 101, for example as described in greater detail further below.

Also as depicted in FIG. 1, in various embodiments, the control system 120 includes a sensor array 130, a display system 132, a transceiver 134, and a controller 136.

In various embodiments, the sensor array 130 includes various sensors that collect sensor data as to the vehicle 100 and the trailer 101, and the surroundings in proximity to the trailer 101 (e.g., in regions in which the trailer 101 may be parked and/or moved). In various embodiments, the sensor array 130 includes one or more cameras 138, Lidar sensors 140, sonar sensors 142, and ultrasonic sensors 144 that are configured to detect objects in proximity to the trailer 101, for example as the trailer 101 is being parked. Also in various embodiments, the sensor array 130 also includes one or more input sensors 146 that are configured to receive user inputs, for example for customizing the profile for the trailer 101 via the display system 132 of the vehicle 100. In certain embodiments, the sensor array 130 may also include one or more other sensors.

In various embodiments, the display system 132 provides interfacing between the control system 120 and one or more drivers or other users of the vehicle 100. In various embodiments, the display system 132 provides information for the driver or other user to help customize the profile for the trailer 101 and receives inputs from the user pertaining thereto. Also in various embodiments, the display system 132 provides information for the user as to detected obstacles in proximity to the trailer 101 to assist in parking or other movement of the trailer 101. In various embodiments, the display system 132 provides this functionality in accordance with instructions provided by the controller 136.

In various embodiments, the transceiver 134 is utilized to transmit messages to a driver or other user of the vehicle 100. In certain embodiments, the transceiver 134 is used to receive and transmit messages with the remote server 170 as to profiles for the trailer 101 and/or for other trailers (e.g., similar trailers). Also in certain embodiments, the transceiver 134 may be utilized to transmit messages to and/or receive messages from the driver or other user, for example as to the profile and/or obstacles detected in proximity to the trailer 101.

In various embodiments, the controller 136 is coupled to the sensor array 130, the display system 132, and the transceiver 134, as well as to the drive system 112 (and/or related systems such as a braking system and/or steering system in certain embodiments). In various embodiments, the controller 136 controls the functionality of the control system 120, as well as of the drive system 112 and related systems.

In various embodiments, the controller (or computer system) 230 provides information and/or control over towing of the trailer 101, including parking the trailer 101 while considering the extensions 103 and the resulting changes in the envelope of the trailer 101 and required clearances when the extensions 103 are extended. In various embodiments, the controller 136 performs these steps in accordance with the steps of the process 200 of FIG. 2 and the sub-processes and implementations of FIGS. 3-7 and described further below in connection therewith.

In various embodiments, the controller 136 (and, in certain embodiments, the control system 120 itself) is disposed within the body 110 of the vehicle 100. In certain embodiments, the controller 136 and/or control system 120 and/or one or more components thereof may be disposed outside the body 110, for example on a remote server, in the cloud, or other device where image processing is performed remotely.

It will be appreciated that the controller 136 may otherwise differ from the embodiment depicted in FIG. 1. For example, the controller 136 may be coupled to or may otherwise utilize one or more remote computer systems and/or other control systems, for example as part of one or more of the above-identified vehicle 100 devices and systems.

As depicted in FIG. 1, in various embodiments, the controller 136 comprises a computer system, and includes a processor 148, a memory 150, an interface 152, a storage device 154, and a computer bus 156. The processor 148 performs the computation and control functions of the controller 136, and may comprise any type of processor or multiple processors, single integrated circuits such as a microprocessor, or any suitable number of integrated circuit devices and/or circuit boards working in cooperation to accomplish the functions of a processing unit. During operation, the processor 148 executes one or more programs 160 contained within the memory 150 and, as such, controls the general operation of the controller 136 in executing the processes described herein, such as the process 200 of FIG. 2 and the sub-processes and implementations of FIGS. 3-7 and as described in connection therewith.

The memory 150 can be any type of suitable memory. For example, the memory 150 may include various types of dynamic random access memory (DRAM) such as SDRAM, the various types of static RAM (SRAM), and the various types of non-volatile memory (PROM, EPROM, and flash). In certain examples, the memory 150 is located on and/or co-located on the same computer chip as the processor 148. In the depicted embodiment, the memory 150 stores the above-referenced program 160 along with one or more profiles 162 (e.g., of the trailer 101 that is towed by the vehicle 100).

The bus 156 serves to transmit programs, data, status and other information or signals between the various components of the computer system of the controller 136. The interface 152 allows communication to the computer system of the controller 136, for example from a system driver and/or another computer system, and can be implemented using any suitable method and apparatus. In one embodiment, the interface 152 obtains the various data from the sensor array 130 and/or the stored profiles 162 from the memory 150. The interface 152 may also include one or more network interfaces to communicate with technicians, and/or one or more storage interfaces to connect to storage apparatuses, such as the storage device 154.

The storage device 154 can be any suitable type of storage apparatus, including various different types of direct access storage and/or other memory devices. In one exemplary embodiment, the storage device 154 comprises a program product from which memory 150 can receive a program 160 that executes one or more embodiments of the process 200 of FIG. 2 and the sub-processes and implementations of FIGS. 3-7 and as described in connection therewith. In another exemplary embodiment, the program product may be directly stored in and/or otherwise accessed by the memory 150 and/or a secondary storage device (e.g., disk 164), such as that referenced below.

The bus 156 can be any suitable physical or logical means of connecting computer systems and components. This includes, but is not limited to, direct hard-wired connections, fiber optics, infrared and wireless bus technologies. During operation, the program 160 is stored in the memory 150 and executed by the processor 148.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 148) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 136 may also otherwise differ from the embodiment depicted in FIG. 1, for example in that the computer system of the controller 136 may be coupled to or may otherwise utilize one or more remote computer systems and/or other control systems.

With continued reference to FIG. 1, in various embodiments the remote server 170 communicates with the control system 120 via one or more wireless communication networks 180. As noted above, in various embodiments, the control system 120 and the remote server 170 share information regarding the profile 162 of the trailer 101 for the vehicle 100 of FIG. 1, as well as additional profiles 178 (discussed below) for different trailers and vehicles.

As depicted in FIG. 1, in various embodiments, the remote server 170 includes a transceiver 172, a processor 174, and a memory 176. In various embodiments, the transceiver 172 is utilized to communicate with the transceiver 134 of the control system 120, including for the sharing of profiles 162, 178 with one another in accordance with instructions provided by the processor 174. Also as depicted in FIG. 1, in various embodiments, the memory 176 of the remote server 170 stores the various profiles 178 of different trailers and vehicles, for example for use in sharing with the trailer 101 and the vehicle 100 of FIG. 1 as well as with various other trailers and vehicles.

Figure 2:
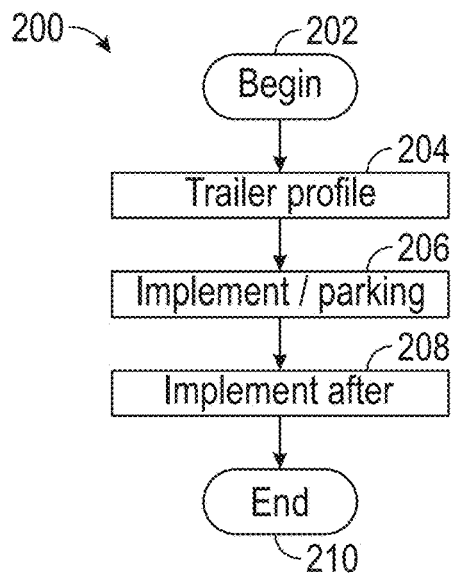
FIG. 2 is a flowchart of a process for controlling parking related functionality for a trailer that is being towed by a vehicle, and that can be implemented in connection with the vehicle, the trailer, and the remote server of FIG. 1, in accordance with exemplary embodiments.

With reference to FIG. 2, a flowchart is provided of a process 200 for controlling parking related functionality for a trailer that is being towed by a vehicle, in accordance with exemplary embodiments. In various embodiments, the process 200 can be implemented in connection with the vehicle 100, the trailer 101, and the remote server 170 of FIG. 1

In various embodiments, the process 200 begins at step 202, for example when the profile for the trailer is being generated. In various embodiments, this may occur when the trailer 101 is towed by the vehicle 100 for the first time in accordance with the process 200. In other embodiments, this may also occur at one or more subsequent times in which the trailer 101 is to be towed by the vehicle 100.

In various embodiments, the trailer profile is generated at step 204. In various embodiments, the trailer profile is generated in advance of towing and parking of the trailer 101, so that the control system 120 is ready to assist with parking and/or other movement of the trailer 101 when the time arrives. In various embodiments, the trailer profile includes not only the dimensions associated with the body of the trailer (e.g., length and width thereof), but also including all extensions 103 thereof and required clearances when fully extended and utilized. Specifically, in various embodiments, the trailer profile utilizes the extensions 103 of the trailer 101 from FIG. 1, along with respective extended regions 104 thereof that will be part of the trailer 101 envelope when parking (e.g., to avoid contact of objects with the extensions 103, and so on). A more detailed explanation of the generating of the profile of step 204 will be provided further below in connection with FIG. 3.

In various embodiments, the trailer profile is implemented during parking maneuvers at step 206. In various embodiments, the trailer profile of step 204 is utilized while the trailer 101 is being parked, such that no objects or impediments will interfere with the trailer 101 as it is parked, after considering the extensions 103 and their respective extended regions 104 and required clearances after the trailer 101 is parked. A more detailed explanation of the utilizing of the trailer profile during parking maneuvers of step 206 will be provided further below in connection with FIG. 4 (along with implementations pertaining thereto in FIGS. 6A, 6B, and 7).

In various embodiments, the trailer profile is also implemented subsequent to parking maneuvers at step 208. In various embodiments, during step 208, the trailer profile of step 204 is utilized after the trailer 101 is being parked and/or as the trailer 101 is exiting the parking spot, for example such that nothing pertaining to the trailer 101 and/or the vehicle 100 is let behind. A more detailed explanation of the utilizing of the trailer profile after the parking maneuvers of step 208 will be provided further below in connection with FIG. 5.

In various embodiments, the process may then terminate at step 210.

Figure 3:
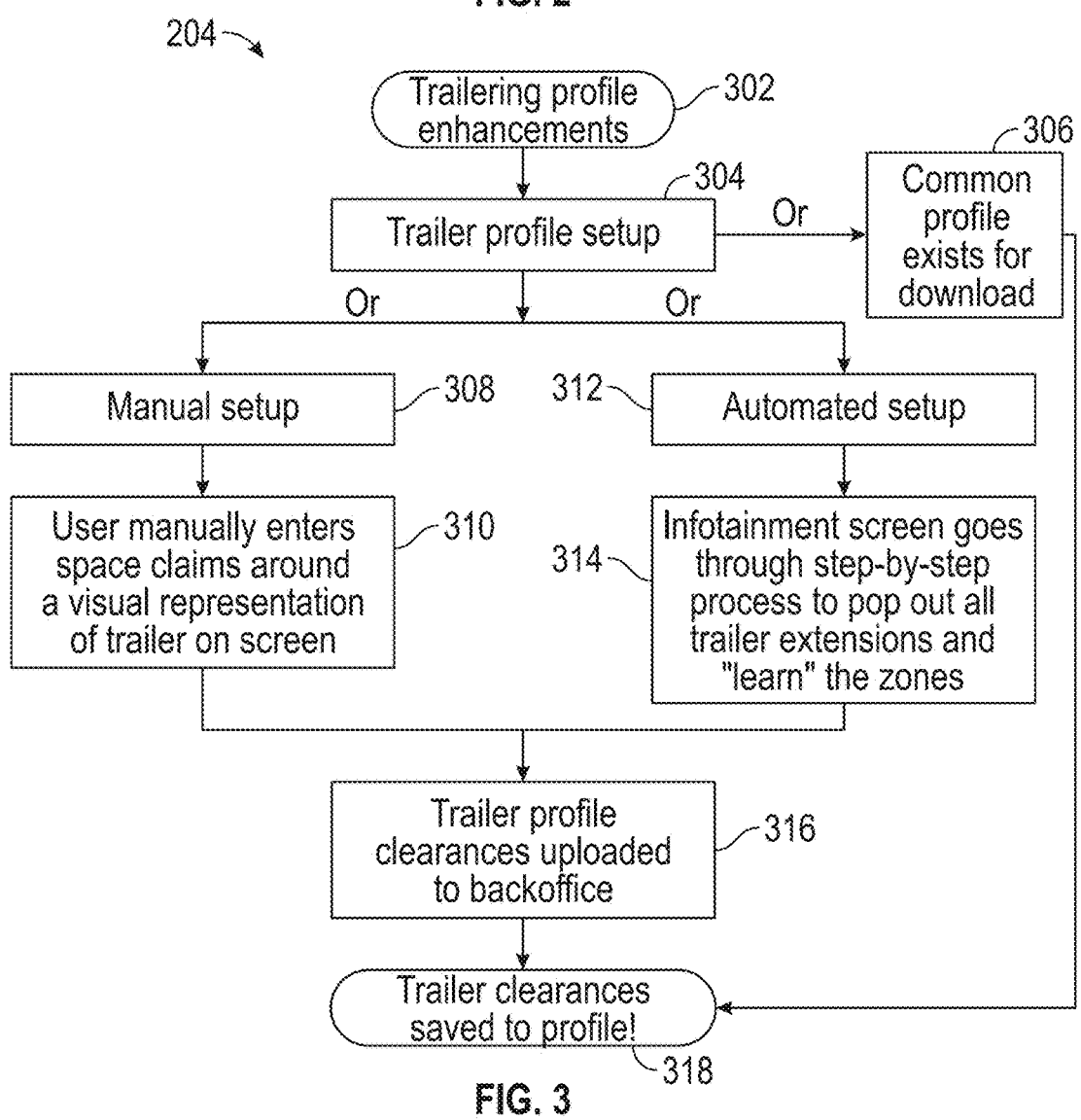
FIG. 3 is a flowchart of a sub-process corresponding to a step of the process of FIG. 2, namely the step of customizing a trailer profile, in accordance with exemplary embodiments.

As alluded to above, FIG. 3 is a flowchart of a sub-process corresponding to step 204 of the process 200 of FIG. 2, namely the step of customizing a trailer profile, in accordance with exemplary embodiments. In various embodiments, the sub-process of step 204 begins when trailering profile enhancements are initiated at step 302. For example, in certain embodiments, a driver or other user of the vehicle 100 may begin preparation or enhancement of a profile pertaining to the trailer 101, such as the first time the trailer 101 is hitched to the vehicle 100 in certain embodiments.

In various embodiments, trailer profile setup is initiated (step 304). In various embodiments, the initiation of the trailer profile setup is initiated via the display system 132 of FIG. 1, in accordance with instructions provided by the processor 148 of FIG. 1, and its interaction with the user. In various embodiments, the setup of the trailer profile may be initiated in one of three manners, as set forth in steps 306, 308, and 312 below, respectively.

In a first implementation illustrated in step 306, a common profile may be utilized for the trailer profile in certain embodiments. Specifically, in certain embodiments, during step 306, the processor 148 may find an existing profile for a similar type of trailer as the trailer 101 that is now hitched to the vehicle 100. For example, in certain embodiments, such an existing profile may already exist for one or more other different owners of one or more other different trailers that have been previously towed by one or more other different vehicles, with the other different trailers having similar dimensions (including of other similar extensions thereof that retract and extend in a similar manner) as the trailer 101 at issue for the present user and the present vehicle 100. In certain embodiments, the common profile may be previously stored in a computer memory, such as in the stored profiles 178 of the memory 176 of the remote server 170 of FIG. 1. Also in certain embodiments, the common profile is transmitted from the remote server 170 to the vehicle 100 of the present user, and is then downloaded and stored in the memory 150 of the vehicle 100 as the current profile 162 therefor with the current trailer 101. In various embodiments, the trailer clearances are saved to the current profile 162 in the memory 150 (step 318).

In a second implementation illustrated in step 308, manual setup of the current profile may be required. Specifically, in certain embodiments, and further with reference to step 310, in various embodiments the user is prompted via a message of the display system 132 to manually enter space claims around a visual representation of the trailer 101 on a display screen of the display system 132. For example, in certain embodiments, the user manually enters the dimensions for the trailer 101, including the extensions 103 and the respective extended regions 104 of FIG. 1 (and associated required clearances) when the extensions 103 are fully extended. In various embodiments, the user inputs are received via the input sensors 146 associated with the display system 132. In various embodiments, the processor 148 constructs the current profile based on the manual inputs, and then stores the current profile in the memory 150 of the vehicle 100 as the current profile 162 therefor for use with the current trailer 101. In various embodiments, the trailer clearances are saved to the current profile 162 in the memory 150 (step 318).

In a third implementation illustrated in step 312, automated setup of the current profile may be utilized. Specifically, in certain embodiments, and further with reference to step 314, in various embodiments the user is prompted via a message of the display system 132 goes through a step by step process to extend or "pop out" all extensions 103 of the trailer 101. In various embodiments, the display system 132 provides the user with prompts for the user to implement the extending of each of the extensions 103 in a step by step manner, and the processor 148 then utilizes sensor data to ascertain and learn the updated dimensions of the trailer 101 when the extensions 103 are extended. In various embodiments, the processor 148 utilizes this data to "learn" the additional zones (e.g., the extended regions 104 of FIG. 1) of the trailer 101 with respect to the extensions 103 of the trailer 101, and automatically builds the current profile for the trailer 101 accordingly. In various embodiments, the processor 148 then stores the current profile in the memory 150 of the vehicle 100 as the current profile 162 therefor for use with the current trailer 101. In various embodiments, the trailer clearances are saved to the current profile 162 in the memory 150 (step 318).

Figure 4:
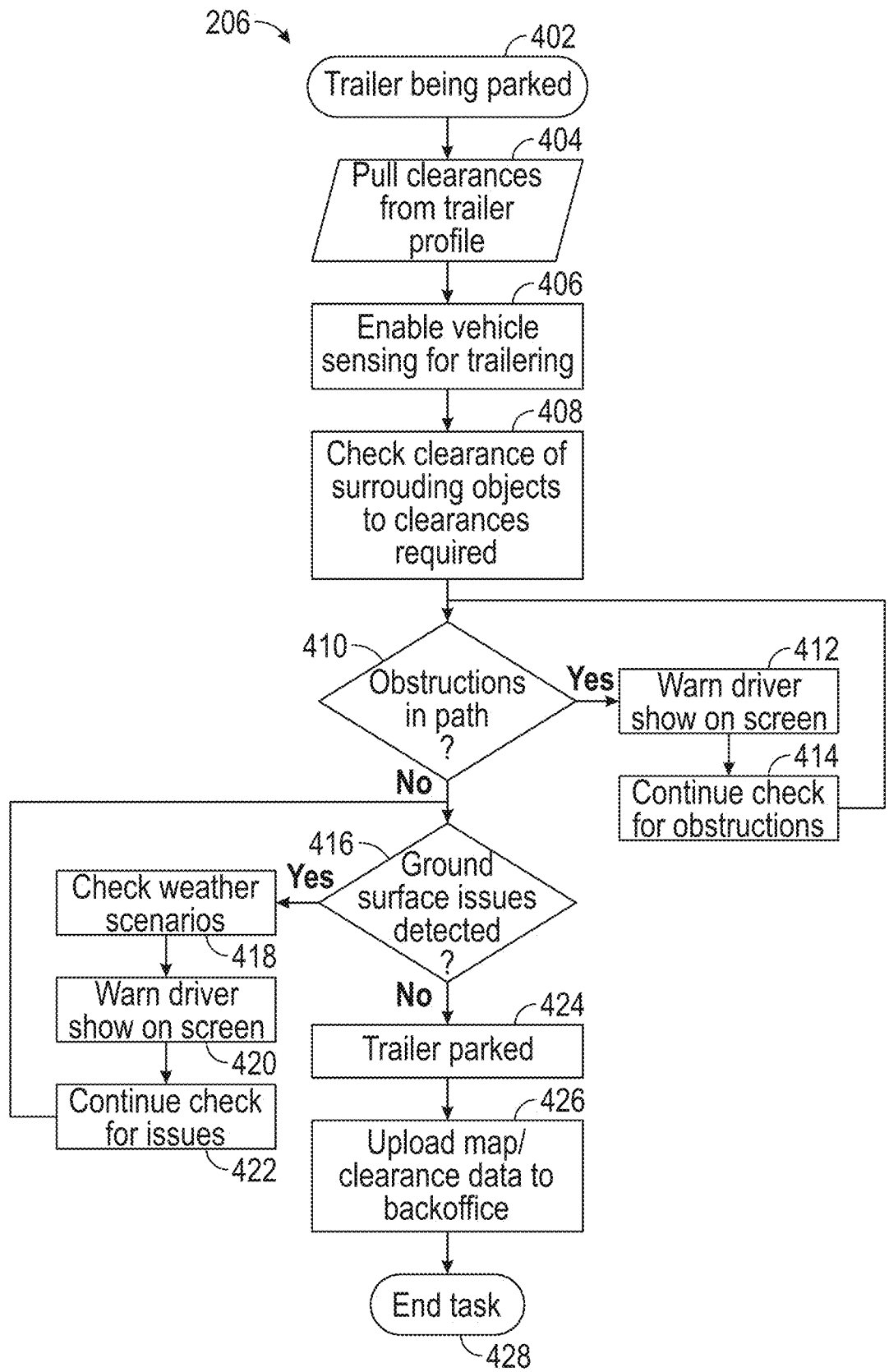
FIG. 4 is a flowchart of a sub-process corresponding to another step of the process of FIG. 2, namely the step of implementing the profile during a parking maneuver for the trailer, in accordance with exemplary embodiments.

FIG. 4 is a flowchart of a sub-process corresponding to step 206 of the process 200 of FIG. 2, namely the step of implementing the profile during a parking maneuver for the trailer, in accordance with exemplary embodiments. The sub-process of step 206 is described below in connection with FIG. 4 as well as FIG. 6A, FIG. B, and FIG. 7, which depict exemplary implementations thereof.

As depicted in FIG. 4, in various embodiments, the sub-process of step 206 begins at step 402 when a parking maneuver is initiated for the trailer (e.g., when the trailer 101 is being parked while hitched to the vehicle 100). In various embodiments, the parking maneuver is initiated at some future time after the above-described profile of step 204 has already been initiated or enhanced.

In various embodiments, trailer clearances are obtained from the trailer profile (step 404). In various embodiments, the processor 148 of FIG. 1 obtains clearances for the trailer 101 from the current profile 162 stored in the memory 150 of FIG. 1, including the dimensions and associated clearances of the trailer 101 when each of the extensions 103 thereof are in their fully extended positions.

Also in various embodiments, vehicle sensing is enabled for trailering (step 406). In various embodiments, the processor 148 of FIG. 1 provides instructions for the sensor array 130 of FIG. 1 to be enabled or woken up in order to obtain sensor data while the trailer 101 is being parked, including obstacles that may be in the path of the trailer 101 and any other conditions that may be present on the ground nearby (e.g., potholes, bumps, and the like).

In various embodiments, clearances are checked (step 408). Specifically, in various embodiments, clearances of any detected surrounding objects are checked, and compared to clearances required based on the current profile for the trailer 101. In various embodiments, this is performed by the processor 148 utilizing the sensor data in comparison with the current profile 162 for the trailer 101. In addition, in various embodiments, the area surrounding the trailer 101 and the parking spot is also examined for a spatial awareness as to hook-ups (e.g., electricity, water, sewage, and the like) that the trailer 101 may utilize while in the parking spot. For example, in various embodiments, in addition to determining potential obstructions, the process also determines the distances to the hook-ups (from the trailer 101) and helps to make sure that such distances to the hook-ups do not exceed a maximum distance from a relevant point on the trailer (which would also be included in the trailer 101 profile in various embodiments).

In various embodiments, a determination is made as to whether any obstructions are in the path of the trailer (step 410). Specifically, in various embodiments, the processor 148 determines whether any detected objects are in the path of the trailer 101 as the trailer 101 is being moved to the parking spot and parked, and also as to whether any detected objects would be in the path of, or would be likely to contact, the trailer 101 as the extensions 103 thereof are fully extended. Also in various embodiments, a determination is made as to relevant hook-ups nearby, and as to whether the distances to the hook-ups exceed a maximum distance.

In various embodiments, if it is determined in step 410 that one or more are obstructions are in the path of the trailer, or that a maximum distance to a hook-up is exceeded, then a notification is provided for the user (step 412). In certain embodiments, a warning as to the obstruction is provided for a driver or other user of the vehicle 100 on a screen of the display system 132 of FIG. 1, in accordance with instructions provided by the processor 148. In certain embodiments, an image of the obstruction (and/or hook-up) may also be displayed on the display screen of the display system 132. In certain other embodiments, the warning may be provided to a smart phone or other personal device of the user, for example via a message transmitted thereto via the transceiver 134 of FIG. 1 in accordance with instructions provided by the processor 148. In addition, in certain embodiments, the processor 148 may also provide instructions for automated control of movement of the vehicle 100 and the trailer 101 (e.g., by automatically moving, braking, and/or steering of the vehicle 100) in order to avoid the obstacles.

In various embodiments, the process 300 continues to check for obstructions and any hook-ups (step 414). Specifically, in various embodiments, additional sensor data continues to be collected via the sensor array 130 and analyzed via the processor 148 with respect to the same obstruction and other possible obstructions and/or issues with nearby hook-ups (such as exceeding the maximum distance to the hook-ups). In various embodiments, the process 300 returns to step 410, and steps 410-414 continue in this manner until a determination is made in a subsequent iteration of step 410 that no obstructions are present in the path of the trailer 101 (and, in various embodiments, that there are no issues with nearby hook-ups).

In various embodiments, once a determination is made that there are not obstructions detected in the path of the trailer (and, in various embodiments, no issues with nearby hook-ups), a determination is made as to whether there are any ground surface conditions or other conditions present that may affect the trailer (step 416). In various embodiments, this determination is made by the processor 148 based on the sensor data as to the ground in proximity to the trailer 101. For example, in certain embodiments, the determination is made as to whether any significant bumps, dips, trenches, puddles, branches, or other conditions are present that would affect the usability of the trailer 101 as it is parked.

In various embodiments, if it is determined that one or more such ground surface conditions or other conditions are present, then weather information is ascertained (step 418). For example, in certain embodiments, weather forecasts may be obtained (e.g., via the transceiver 134 of FIG. 1) for a geographic region in which the trailer 101 is being parked, that may affect the trailer 101 particularly given the ground surface conditions or other conditions. For example, in various embodiments, if rain or other inclement weather is likely for the geographic region, then this may adversely affect the ground surface conditions for the trailer 101 (e.g., a dip or trench in the ground surface may soon be filled with water, and so on). By way of additional example, if one or more other conditions are presents (such as branches or other obstacles that may be in proximity to the trailer 101), then when a storm approaches the branches may droop down and make contact with the trailer 101, and so on.

In various embodiments, a notification is provided for the user (step 420). In certain embodiments, a warning as to the ground surface conditions, along with any weather forecast or other information that may have an effect on the ground surface conditions or other conditions, is provided for a driver or other user of the vehicle 100 on a screen of the display system 132 of FIG. 1, in accordance with instructions provided by the processor 148. In certain embodiments, an image of the ground surface condition or other condition may also be displayed on the display screen of the display system 132. In certain other embodiments, the warning may be provided to a smart phone or other personal device of the user, for example via a message transmitted thereto via the transceiver 134 of FIG. 1 in accordance with instructions provided by the processor 148. In addition, in certain embodiments, the processor 148 may also provide instructions for automated control of movement of the vehicle 100 and the trailer 101 (e.g., by automatically moving, braking, and/or steering of the vehicle 100) in order to avoid or mitigate the ground conditions.

In various embodiments, the process 300 continues to check for issues, including other ground surface conditions (step 422). Specifically, in various embodiments, additional sensor data continues to be collected via the sensor array 130 and analyzed via the processor 148 with respect to the same ground surface conditions and other possible ground surface conditions. In various embodiments, the process 300 returns to step 416, and steps 416-422 continue in this manner until a determination is made in a subsequent iteration of step 416 that no adverse ground surface conditions are surrounding the trailer 101.

In various embodiments, once a determination is made that there are not adverse ground surface conditions, the trailer is parked (step 424). In addition, in certain embodiments, updated information as to the trailer 101 and the parking thereof (e.g., including an updated map and updated clearance data for the trailer 101) are stored. In certain embodiments, the updated information is stored in the memory 150 of the vehicle 100 as part of an updated profile 162 for the trailer 101. In addition, in certain embodiments, the updated information is transmitted to the remote server 170, where the updated information as stored in an updated profile 178 that is stored in the memory 176 thereof for subsequent users of other vehicles and trailers.

In various embodiments, the sub-process of step 206 then terminates (step 428).

Figure 6A:
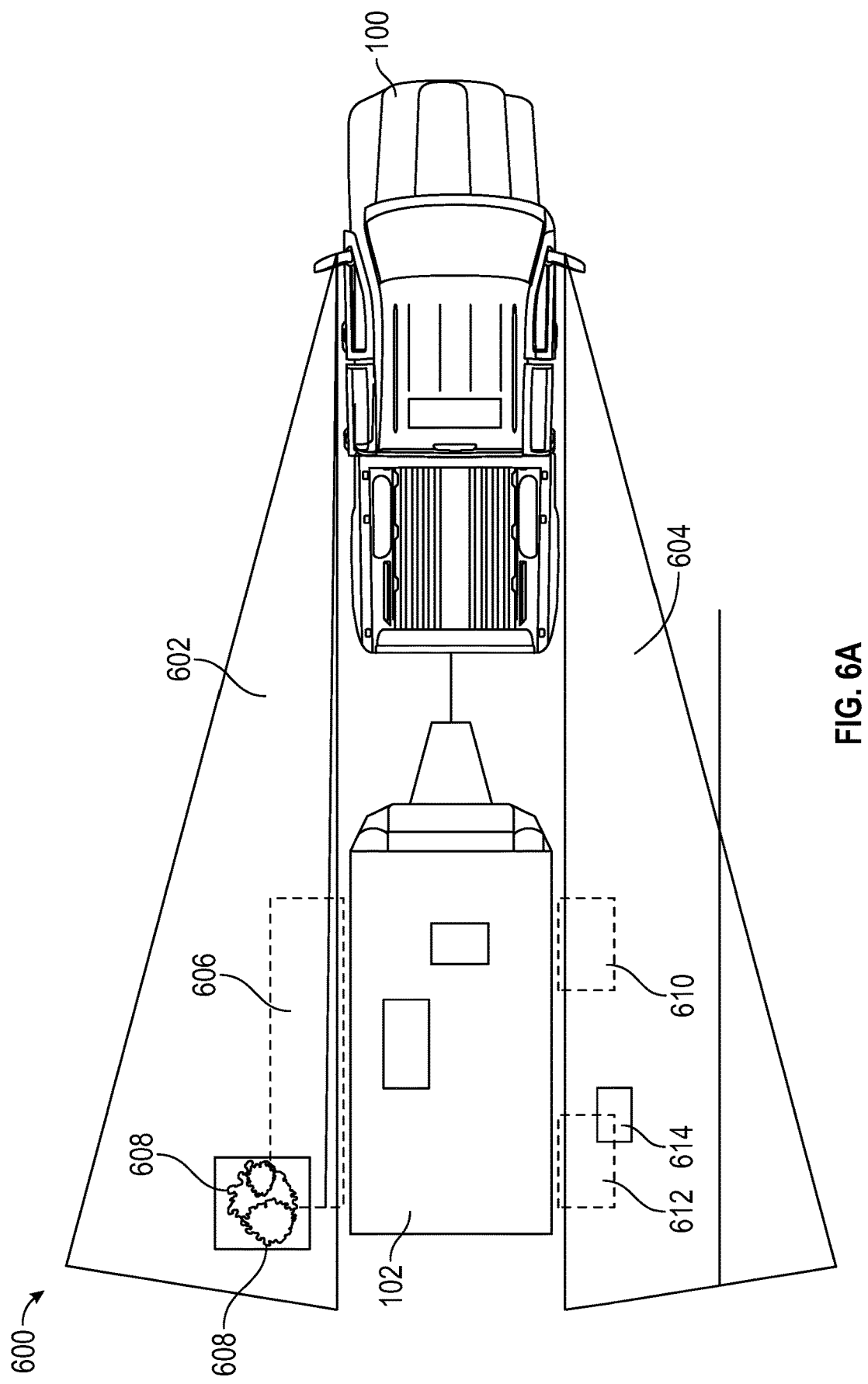
FIGS. 6A, 6B, and FIG. 7 provide exemplary implementations of the process of FIG. 2, including the sub-process of FIG. 3, in accordance with exemplary embodiments.
Figure 6B:
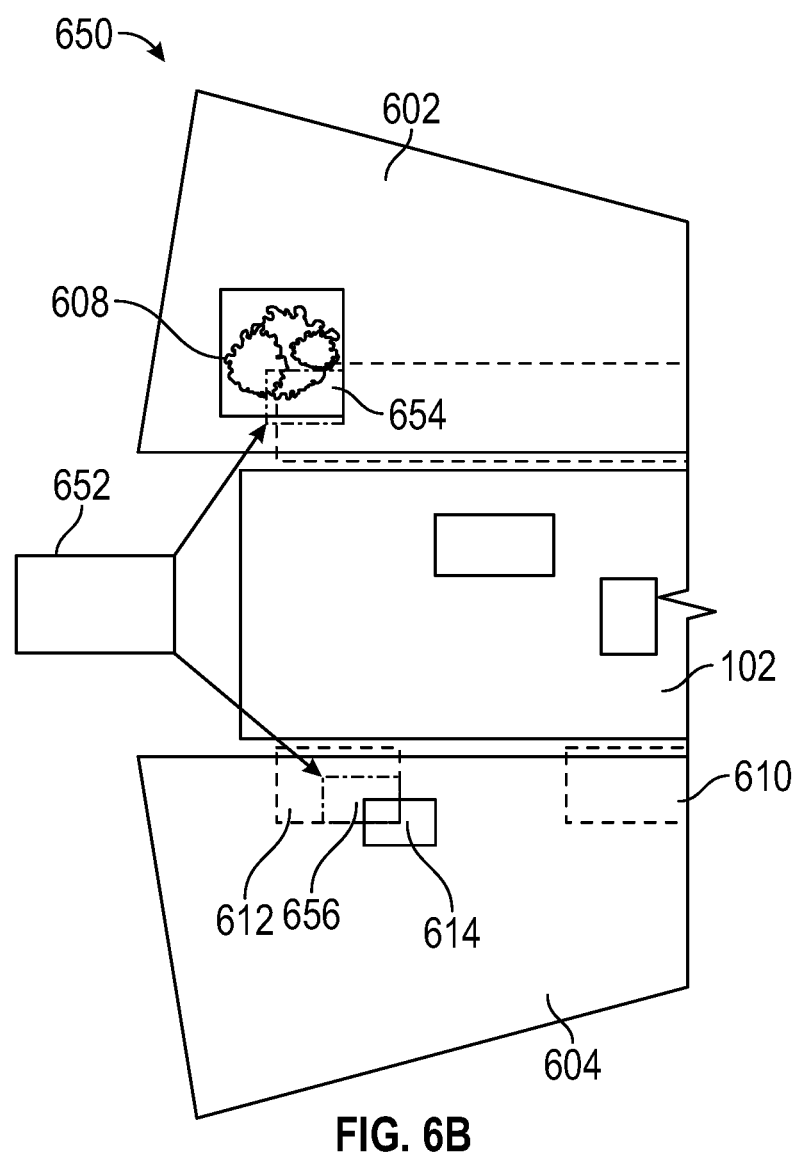

With respect to FIGS. 6A, and 6B, a first implementation of the sub-process of step 206 is provided. First, as depicted in FIG. 6A, a first illustration 600 is provided for the vehicle 100 and the trailer 101 as the trailer 101 is being parked. As shown in FIG. 6A, in various embodiments, the sensors of the sensor array 130 of the vehicle 100 provide sensor detection in a first sensor region 602 and a second sensor region 604.

As depicted in FIG. 6A, within the first sensor region 602 is a clearance region 606 required for extensions 103 of the trailer 101 when the extensions 103 are fully extended. Also as depicted in FIG. 6A, in the exemplary embodiment, an obstruction 608 (i.e., a tree) is disposed within a part of the clearance region 606.

Also as depicted in FIG. 6A, within the second sensor region 604 are multiple clearance regions 610, 612 that are required for other extensions 103 of the trailer 101 when the extensions 103 are fully extended. Also as depicted in FIG. 6A, in the exemplary embodiment, one or more obstructions 614 are present within a part of clearance region 612.

With reference now to FIG. 6B, a second illustration 650 is provided, with a magnification of a region of interest associated with the obstructions 608, 614. As depicted in FIG. 6B, multiple collisions 652 are depicted for the trailer 101 for when the extensions 103 are fully extended. Also as depicted in FIG. 6B, the obstruction 608 (i.e., the tree) would be expected to contact a portion 654 of the trailer 101 when the extensions 103 are fully extended. Also as depicted in FIG. 6B, the obstruction 614 would be expected to contact a portion 656 of the trailer 101 when the extensions 103 are fully extended.

Figure 7:
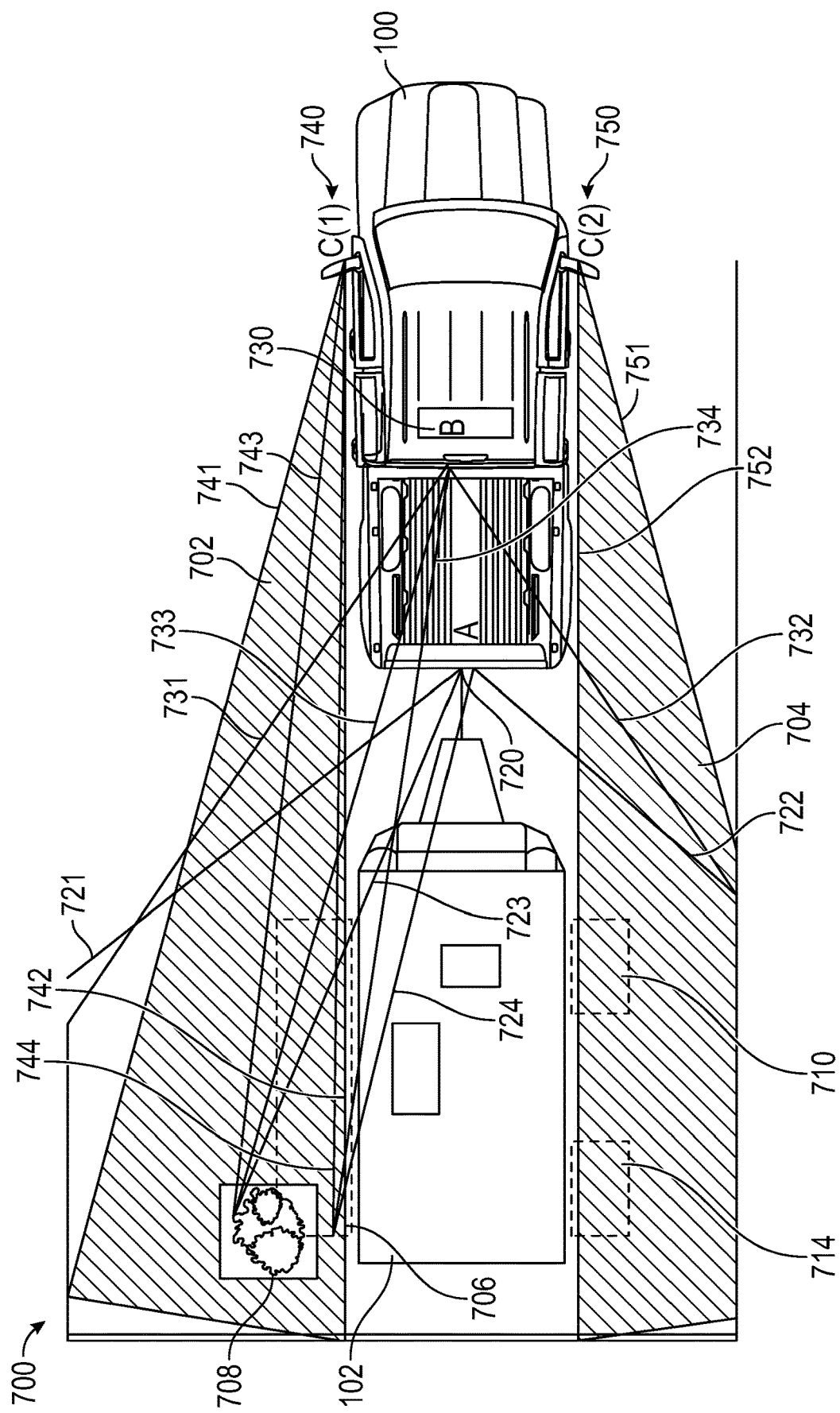

With respect to FIG. 7, an illustration 700 is provided of a second implementation of the sub-process of step 206 is provided. Specifically, as depicted in FIG. 7, in certain embodiments various sensors of the sensor array 130 are located at different locations of the vehicle, including: (i) a first point "A" 720 (e.g., proximate the hitch of the vehicle 100); (ii) a second point "B" 730 (e.g., proximate a midpoint or middle region of the vehicle 100); and (iii) third and fourth points "C1" 740 and "C2" 750 (proximate respective side view mirrors of the vehicle 100).

Also as depicted in the illustration 700 of FIG. 7, the extensions 103 of the trailer require clearance in a first clearance region 706, a second clearance region 710, and a third clearance region 712. In an exemplary embodiment, the first clearance region 706 includes an obstruction 708 (e.g., a tree).

As depicted in FIG. 7, the sensors at point "A" 720 of the vehicle provide detection zones that include a first sensor ray 721, a second sensor ray 722, a third sensor ray 723, and a fourth sensor ray 724. In the depicted embodiment, the obstruction 708 is not detected by the first and second sensor rays 721, 722, but is detected via the third and fourth sensor rays 723, 724.

Also as depicted in FIG. 7, the sensors at point "B" 730 of the vehicle provide detection zones that include a first sensor ray 731, a second sensor ray 732, a third sensor ray 733, and a fourth sensor ray 734. In the depicted embodiment, the obstruction 708 is not detected by the first and second sensor rays 731, 732, but is detected via the third and fourth sensor rays 733, 734.

Also as depicted in FIG. 7, the sensors at point "C1" 740 of the vehicle provide detection zones that include a first sensor ray 741, a second sensor ray 742, a third sensor ray 743, and a fourth sensor ray 744. In the depicted embodiment, the obstruction 708 is not detected by the first and second sensor rays 741, 742, but is detected via the third and fourth sensor rays 743, 744.

Also as depicted in FIG. 7, the sensors at point "C2" 750 of the vehicle provide detection zones that include a first sensor ray 751 and a second sensor ray 752, neither of which detect the obstruction 708 (however, that would potentially detect obstructions if any were present in clearance regions 710 and/or 714 of FIG. 7).

As illustrated in FIG. 7, in various embodiments, sensors are utilized at various locations on the vehicle 100, with corresponding different angles associated with the corresponding detection zones and sensor rays. In various embodiments, the processor 148 aggregates the various sensor data from the various different angles for detection of the obstacles, using trigonometric principles as applied to the various different angles.

Figure 5:
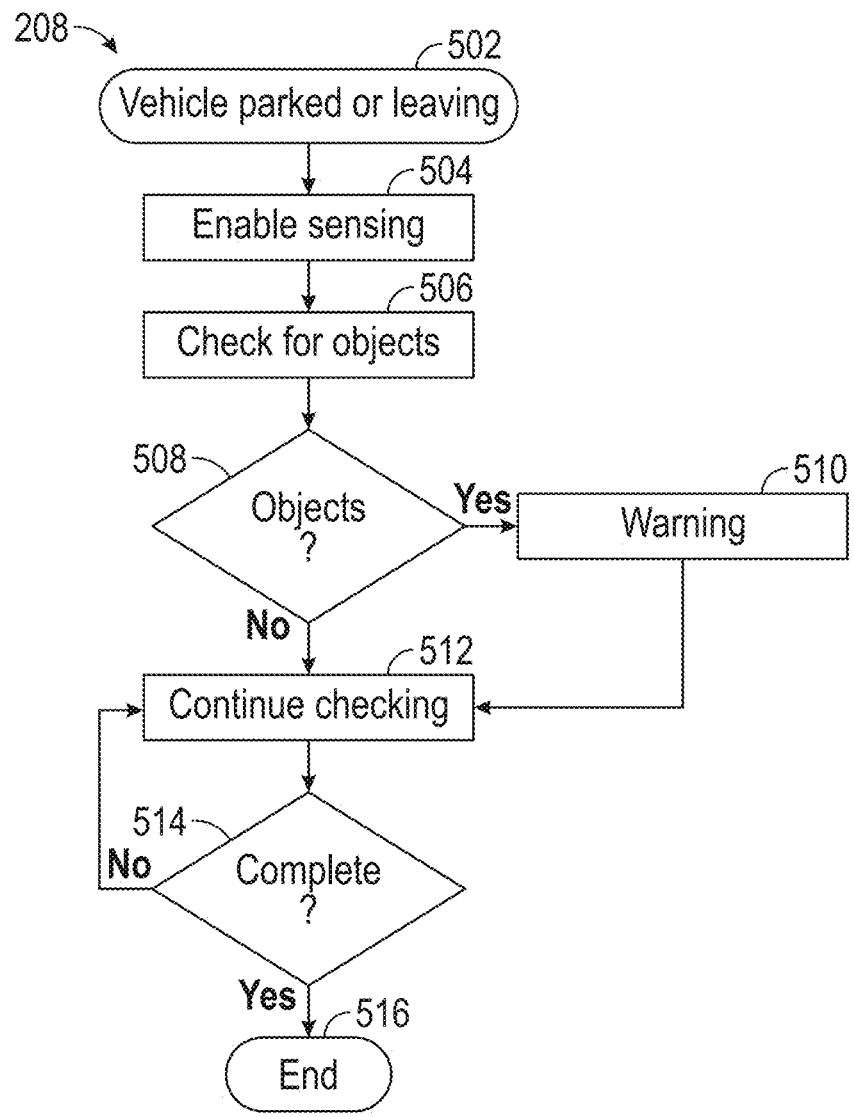
FIG. 5 is a flowchart of a sub-process corresponding to an additional step of the process of FIG. 2, namely the step of implementing the profile following a parking maneuver for the trailer, in accordance with exemplary embodiments.

FIG. 5 is a flowchart of a sub-process corresponding to step 208 of the process 200 of FIG. 2, namely the step of implementing the profile subsequent to a parking maneuver for the trailer, in accordance with exemplary embodiments.

As depicted in FIG. 5, in various embodiments, the sub-process of step 208 begins at 502 during one or more times after the parking maneuver of step 206 has already been completed for the trailer (e.g., when the trailer 101 is still hitched to the vehicle 100 while the trailer 101 is already parked in a parking spot, and/or when the trailer 101 is exiting the parking spot while being towed by the vehicle 100).

In various embodiments, vehicle sensing is enabled for trailering (step 504). In various embodiments, the processor 148 of FIG. 1 provides instructions for the sensor array 130 of FIG. 1 to be enabled or woken up in order to obtain sensor data after the trailer 101 has been parked and remains in the parking spot and/or when the trailer 101 is exiting the parking spot, including obstacles that may be in the path of the trailer 101 and/or that may be left behind by the trailer 101 (e.g., as to whether the trailer 101 is still hooked up to water, power, and/or other services, and/or as to whether any trailer 101 components, accessories, and/or other belongings of the user may be left behind and/or may be in the path of the trailer 101, and the like).

In various embodiments, a check is performed as to nearby obstacles using the sensor data (step 506), and a determination is made as to whether any obstructions are in the path of the trailer and/or may be left behind (e.g. in the parking spot) (step 508). Specifically, in various embodiments, the processor 148 makes this determination based on the sensor data as the trailer 101 remains in the parking spot and/or is exiting from the parking spot.

In various embodiments, if it is determined in step 508 that one or more are obstructions are presents, then a notification is provided for the user (step 510). In certain embodiments, a warning as to the obstruction is provided for a driver or other user of the vehicle 100 on a screen of the display system 132 of FIG. 1, in accordance with instructions provided by the processor 148. In certain embodiments, an image of the obstruction may also be displayed on the display screen of the display system 132. In certain other embodiments, the warning may be provided to a smart phone or other personal device of the user, for example via a message transmitted thereto via the transceiver 134 of FIG. 1 in accordance with instructions provided by the processor 148.

In various embodiments, the process 300 continues to check for obstructions (step 512), regardless of whether a warning was warranted. Specifically, in various embodiments, additional sensor data continues to be collected via the sensor array 130 and analyzed via the processor 148 with respect to the same obstruction and other possible obstructions.

In various embodiments, a determination is made as to whether the process 300 is complete (step 514). In certain embodiments, during step 514, the processor 148 determines whether the post-parking maneuver is complete (e.g., when the trailer 101 has fully exited the parking spot). In various embodiments, if the process 300 is not yet deemed to be complete, then the process 300 returns to step 512, and steps 512-514 thereafter repeat until a determination is made that the process is complete.

In various embodiments, once a determination is made in an iteration of step 514 that the process 300 is complete (e.g., that the trailer 101 has fully exited the parking spot), the process terminates at step 516.

Accordingly, methods, systems, and vehicles are provided herein that provide for potentially improved information for and control of parking a trailer that is being towed by a vehicle. In various embodiments, various sensor data is utilized in detecting objects that may interfere with parking of the trailer 101, after consideration of extensions 103 of the trailer 101 that will encompass different respective regions and require extended clearances after the extensions 103 are extended. In various embodiments, this may help to improve the experience for users of the trailer 101 and the vehicle 100, for example by helping to prevent unwanted contact between obstacle and the trailer and/or other impediments for parking and/or movement of the trailer 101.

In addition, rather than by considering only the body of the trailer as it is being towed or parked, the consideration also of the extensions 103 of the trailer helps to prevent a situation in which the trailer 101 is parked and then the user realizes that the trailer extensions 103 cannot be fully utilized due to an obstruction or ground surface condition in the parking spot, and so on. Therefore, this provides a type of usage protection for the trailer 101, for example by detecting collisions or obstructions ahead of time that may subsequently be present after the trailer is fully set up in the parking spot.

It will be appreciated that the systems, vehicles, and methods may vary from those depicted in the Figures and described herein. For example, the vehicle 100, the trailer 101, the remote server 170, and/or components thereof may different from those depicted in FIG. 1 and/or described therein. It will similarly be appreciated that the steps of the process 200 of FIG. 2, the sub-routines of FIGS. 3-5, and the implementations of FIGS. 6A, 6B, and 7 may differ from those depicted in the Figures, and/or that various steps may occur concurrently and/or in a different order than that depicted in the Figures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining, via one or more sensors of a vehicle that is towing a trailer, sensor data pertaining to surroundings of the trailer;
   retrieving information as to a profile of the trailer, the profile comprising required clearances for the trailer based on one or more extensions of the trailer that are configured to be retracted while the trailer is moving and fully extended when the trailer is parked and the one or more extensions are utilized;
   determining, via a processor, whether any obstacles are in a path of the trailer when the one or more extensions are fully extended, based on the sensor data and the profile;
   taking an action, in accordance with instructions provided by the processor, when it is determined that one or more obstacles are in the path of the trailer;
   determining, via the processor, whether any ground surface issues are present in proximity to the trailer for when the one or more extensions are fully extended, based on the sensor data and the profile; and
   taking the action, in accordance with the instructions provided by the processor, when it is determined that one or more ground surface issues proximate the trailer.

2. The method of claim 1, wherein the step of taking the action comprises providing a warning for a user on a display system of the vehicle in accordance with the instructions provided by the processor when it is determined that one or more obstacles are in the path of the trailer.

3. The method of claim 1, wherein the step of taking the action comprises performing an automatic control action pertaining to movement of the vehicle in accordance with the instructions provided by the processor when it is determined that one or more obstacles are in the path of the trailer.

4. The method of claim 1, wherein the determining as to whether any obstacles are in the path of the trailer is performed before the one or more extensions are fully extended.

5. The method of claim 4, wherein the determining as to whether any obstacles are in the path of the trailer is performed while the trailer is being parked in a parking spot as it is towed by the vehicle.

6. The method of claim 5, further comprising:
   generating, via the processor, the profile for the trailer based on information as to the one or more extensions of the trailer and respective clearances required for the one or more extensions when fully extended; and
   storing, into a non-transitory computer readable storage medium of the vehicle, the profile for the trailer prior to towing the trailer by the vehicle.

7. The method of claim 6, further comprising:
   transmitting the profile to a remote server for storage at the remote server.

8. The method of claim 5, further comprising:
   obtaining, via a transceiver, the profile from a remote server pertaining to one or more other trailers with similar characteristics as the trailer; and
   storing, into a non-transitory computer readable storage medium of the vehicle, the profile prior to towing the trailer by the vehicle.

9. The method of claim 1, further comprising:
   determining, via the processor, whether any conditions are present in proximity to the trailer for when the one or more extensions are fully extended, based on the sensor data and the profile;
   obtaining weather conditions in proximity to the trailer that may affect the conditions; and
   taking the action, in accordance with the instructions provided by the processor, when it is determined that the conditions are likely to pose a problem given the weather conditions.

10. The method of claim 1, further comprising:
    determining, via the processor using the sensor data, respective distances of one or more hook-ups to the trailer; and
    taking the action, in accordance with the instructions provided by the processor, when it is determined that one or more of the respective distances exceed a predetermined threshold.

11. A system comprising:
    one or more sensors of a vehicle that is configured to tow a trailer, the one or more sensors configured to obtain sensor data pertaining to surroundings of the trailer; and a processor that is coupled to the one or more sensors and that is configured to at least facilitate:

retrieving information as to a profile of the trailer, the profile comprising required clearances for the trailer based on one or more extensions of the trailer that are configured to be retracted while the trailer is moving and fully extended when the trailer is parked and the one or more extensions are utilized;

determining whether any obstacles are in a path of the trailer when the one or more extensions are fully extended, based on the sensor data and the profile;

taking an action, in accordance with instructions provided by the processor, when it is determined that one or more obstacles are in the path of the trailer;

determining whether any ground surface issues are present in proximity to the vehicle for when the one or more extensions are fully extended, based on the sensor data and the profile; and taking the action, in accordance with the instructions provided by the processor, when it is determined that one or more ground surface issues proximate the trailer.

12. The system of claim 11, wherein the processor is further configured to at least facilitate providing a warning for a user on a display system of the vehicle in accordance with the instructions provided by the processor when it is determined that one or more obstacles are in the path of the trailer.

13. The system of claim 11, wherein the processor is further configured to at least facilitate performing an automatic control action pertaining to movement of the vehicle in accordance with the instructions provided by the processor when it is determined that one or more obstacles are in the path of the trailer.

14. The system of claim 11, wherein the processor is further configured to at least facilitate determining whether any obstacles are in the path of the trailer before the one or more extensions are fully extended and the trailer is being parked in a parking spot as it is towed by the vehicle.

15. The system of claim 14, wherein the processor is further configured to at least facilitate:

generating the profile for the trailer based on information as to the one or more extensions of the trailer and respective clearances required for the one or more extensions when fully extended; and storing, into a non-transitory computer readable storage medium of the vehicle, the profile for the trailer prior to towing the trailer by the vehicle.

16. The system of claim 15, wherein the processor is further configured to at least facilitate transmitting the profile to a remote server for storage at the remote server.

17. The system of claim 14, wherein the processor is further configured to at least facilitate:

obtaining, via a transceiver, the profile from a remote server pertaining to one or more other trailers with similar characteristics as the trailer; and storing, into a non-transitory computer readable storage medium of the vehicle, the profile prior to towing the trailer by the vehicle.

18. A vehicle comprising:

a body;

a propulsion system configured to generate movement of the body;

a hitch for coupling to a trailer for towing the trailer;

one or more sensors that are configured to obtain sensor data pertaining to surroundings of the trailer; and a processor that is coupled to the one or more sensors and that is configured to at least facilitate:

retrieving information as to a profile of the trailer, the profile comprising required clearances for the trailer based on one or more extensions of the trailer that are configured to be retracted while the trailer is moving and fully extended when the trailer is parked and the one or more extensions are utilized;

determining whether any obstacles are in a path of the trailer when the one or more extensions are fully extended, based on the sensor data and the profile;

taking an action, in accordance with instructions provided by the processor, when it is determined that one or more obstacles are in the path of the trailer;

determining whether any ground surface issues are present in proximity to the vehicle for when the one or more extensions are fully extended, based on the sensor data and the profile; and taking the action, in accordance with the instructions provided by the processor, when it is determined that one or more ground surface issues proximate the trailer.

19. The vehicle of claim 18, wherein the processor is further configured to at least facilitate:

determining whether any conditions are present in proximity to the trailer for when the one or more extensions are fully extended, based on the sensor data and the profile;

obtaining weather conditions in proximity to the trailer that may affect the conditions; and taking the action, in accordance with the instructions provided by the processor, when it is determined that the conditions are likely to pose a problem given the weather conditions.

20. The vehicle of claim 18, wherein the processor is further configured to at least facilitate:

determining, using the sensor data, respective distances of one or more hook-ups to the trailer; and taking the action, in accordance with the instructions provided by the processor, when it is determined that one or more of the respective distances exceed a predetermined threshold.

* * * * *